United States Patent
Hung et al.

(10) Patent No.: US 8,239,619 B2
(45) Date of Patent: Aug. 7, 2012

(54) METHOD AND APPARATUS FOR HIGH-SPEED BYTE-ACCESS IN BLOCK-BASED FLASH MEMORY

(75) Inventors: Chun-Hsiung Hung, Hsinchu (TW);
Hsin-Yi Ho, Hsinchu (TW);
Hsiang-Pang Li, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 142 days.

(21) Appl. No.: 12/833,305

(22) Filed: Jul. 9, 2010

(65) Prior Publication Data

US 2012/0011300 A1 Jan. 12, 2012

(51) Int. Cl.
*G06F 12/00* (2006.01)
*G06F 9/26* (2006.01)

(52) U.S. Cl. ........................................ 711/103; 711/208

(58) Field of Classification Search .................... 711/103
See application file for complete search history.

(56) References Cited

U.S. PATENT DOCUMENTS

| 5,341,339 A | 8/1994 | Wells |
| 5,485,595 A | 1/1996 | Assar et al. |
| 5,845,313 A | 12/1998 | Estakhri et al. |
| 6,000,006 A | 12/1999 | Bruce et al. |
| 6,115,785 A | 9/2000 | Estakhri et al. |

*Primary Examiner* — Yaima Campos
*Assistant Examiner* — Hamdy S Ahmed
(74) *Attorney, Agent, or Firm* — Haynes Beffel & Wolfeld LLP

(57) ABSTRACT

Techniques utilizing an erase-once, program-many progressive indexing structure manage data in a flash memory device which avoids the need to perform sector erase operations each time data stored in the flash memory device is updated. As a result, a large number of write operations can be performed before a sector erase operation is needed. Consequently, block-based flash memory can be used for high-speed byte access.

23 Claims, 11 Drawing Sheets

METHOD AND APPARATUS FOR HIGH-SPEED BYTE-ACCESS IN BLOCK-BASED FLASH MEMORY

BACKGROUND OF THE INVENTION

1. Field of the Invention

The present invention relates to flash memory technology, and more particularly to techniques for managing data for high speed, random access in flash memory devices.

2. Description of Related Art

Electrically Erasable Programmable Read-Only Memory (EEPROM) and flash memory include memory cells that store charge between the channel and gate of a field effect transistor. The charge stored affects the threshold voltage of the transistor, and the changes in threshold voltage due to the stored charge can be sensed to indicate data stored in the memory cell. Another type of charge data cell is referred to as a charge trapping memory cell, which is used a dielectric layer in place of the floating gate.

The term "write" as used herein describes an operation which changes the threshold voltage of the transistor, and is intended to encompass operations for increasing and for decreasing the threshold voltage of the transistor. In EEPROM and in flash, write operations involve a first erase step, to set all the cells in the memory segment to an erased state, followed by a program step, to set selected cells in the memory segment to the programmed state. The term "program" as used herein refers to an operation which can be carried out in flash memory on a bit-by-bit basis, while the term "erase" as used herein refers to an operation which, due to the configuration of the flash memory cells, is carried out typically in flash memory on a sector or block basis. Therefore, in flash memory, to program a single byte, the write operation must first erase a larger sector of the memory array, and restore the data for the entire sector.

In an EEPROM device the memory cells can be erased on a byte-by-byte basis, independent of the other data bytes. However, to enable erasing on a byte-by-byte basis, the memory density of EEPROM is relatively low.

EEPROM and flash memory devices are often used for different applications. Generally, because of its higher density, flash memory is more economical than EEPROM in mass data storage applications. EEPROM is commonly used in applications where programming and erasing small amounts of data is needed, such as for storing status data, configuration data that must be changed from time to time, and the like.

A variety of electronic devices include both EEPROM and flash memory, in order to fulfill different memory performance requirements required of various functions of the device. However, using both of these types of memory increases the cost and complexity of the device.

A specific issue arising in flash memory is limited endurance, the number of erase and program operations over which the cells in the device remain operative and reliable. Thus, repeated and frequent writes to a single sector, or a small number of sectors, will result in some of the sectors becoming defective in a relatively short time.

Various "wear-leveling" techniques have been proposed for extending the lifetime of flash memory. One wear-leveling approach involves the use of counters to track the number of times each sector is erased. The counters are then used to alter the mapping of data into the various sectors, to even out their wear. See, for example, U.S. Pat. Nos. 6,000,006; 5,485,595; and 5,341,339.

Although the use of counters can extend the lifetime of flash memory devices, the problem of limited endurance continues to preclude the use of flash memory in applications requiring a large number of write operations.

Another wear-leveling approach is to write updated data to an unused physical location in the flash memory device, rather than overwriting old data in the original location. This reduces the number of sector erase operations for a given number of write operations to the flash memory device. See, for example, U.S. Pat. Nos. 5,845,313 and 6,115,785.

In order to track the changes in the physical locations of the data, a programmable mapping or address translation table can be used. The programming mapping table stores mapping information between the logical addresses specified by an external system and the actual physical addresses of the flash device containing the valid data. In order to accurately track the physical locations of valid data, the programmable mapping table is updated during operation.

To ensure that valid data is preserved, the mapping information must be preserved when power is no longer being supplied to the flash device. However, since the programmable mapping table is continuously being updated, storing the mapping information in the flash memory reduces the life of the device due to its limited endurance. This can also significantly impact the performance of a system utilizing flash memory, due to the relatively slow erase cycle of the flash memory. The programmable mapping table may alternatively be stored in another non-volatile memory circuit on the flash device. However, this increases the cost and complexity of the flash device.

It is therefore desirable to provide flash memory devices for applications that often require performance characteristics of EEPROM like high speed byte access, while also addressing the issue of endurance with reduced complexity and cost.

SUMMARY OF THE INVENTION

A method for operating a flash memory array suitable for high-speed byte access is described. The method includes allocating a plurality of sectors of data cells having sector addresses in the flash memory array to store respective data structures, where a data structure is arranged to store a byte of data (or other N-bit-wide data set) that is identified by a logical address, and includes an index field and a data field. The data structure is initialized by erasing the index field and the data field. The logical address of the byte of data is mapped to the sector address of a sector storing a data structure for the data. To write a byte of data having a logical address matching a particular sector address, the process programs a data cell in the index field in the data structure within the particular sector, where the data cell corresponds with a particular byte-wide segment in the data field, and programs the corresponding byte-wide segment of the data structure to store the byte of data. To read a byte of data in response to a logical address, the index field in the data structure is used to identify the particular byte-wide segment storing current data. The current data is provided in response to a read operation.

An embodiment of the data structure includes an index field comprising a pointer field having data cells storing M bits, for example 28 bits, having an address order in the sector, and includes a data field that includes M-byte-wide segments, for example 28-byte-wide segments, in address order. Each of the M bits in address order can correspond with one of the M-byte-wide segments in the same address order. A last one of the M bits in the pointer field to have been programmed corresponds with a most recently used one of the M-byte-wide segments in the data field.

An embodiment described herein provides an index field including a pointer field storing M bits in address order, and the data field includes M-byte-wide segments in address order. When each data cell stores a single bit, then the pointer field includes M data cells. When a first data cell storing a first bit in the pointer field is programmed and the rest of the data cells in the pointer field remain erased, the pointer field points to a first one of the byte-wide segments in address order. When the first bit and a second bit in the pointer field are programmed and the rest of the data cells in the pointer field remain erased, the pointer field points to a second one of the byte-wide segments in address order. When all of the M bits in the pointer field are programmed, the pointer points to a last one of the byte-wide segments in address order.

An embodiment described herein of the data structure provides an index field that includes a status field for the data structure, which after initialization is set, so that all of the data cells in the index field are in the erased state. The status field includes at least K−1 bits in address order, and indicates a current one of K progressive states assumed during utilization of the data structure. According to an example described herein, in an initial state all of the K−1 bits in the status field are erased. In a first progressive state, a data cell for a first one of the bits in the status field is programmed and the rest of the data cells in the status field remain erased. In a second progressive state, the first one and a second one of the bits in the status field are programmed and the rest of the data cells in the status field remain erased, and so on. In a last progressive state all of the data cells for the K−1 bits are programmed.

For use in a data processing system, an address translation table can be stored, which maps logical addresses for bytes of data to sectors of memory cells in the flash array. A plurality of data structures as described above can be initialized in the respective sectors of memory cells, and mapped to the corresponding logical addresses in the address translation table. The status field in the index field is utilized to manage the status of the data structures for use in maintaining the address translation table.

In the case in which all of the byte-wide segments in a particular data structure have been utilized, the current byte in the data structure can be copied to a new data structure, and the address translation table can be updated to map the logical address of the old data structure to the new data structure. A process for managing the copying of the current byte to a new data structure includes updating the status field. For example, a status field can include four bits, and be used to reflect five states. An initial state indicated by the status field reflects that the data structure is initialized and no logical address is mapped to the data structure. A first state indicated by the status field indicates that the new data structure is selected for logical address mapping and suitable for replacing an old data structure. A second state indicated by the status field indicates that the writing of the current byte of data into the new data structure from the source data structure (or other data source) is completed. A third state indicated by the status field indicates that an erase process has begun to reinitialize the old data structure. A fourth state indicated by the status field indicates that the erase process in the old data structure has completed, and the logical address mapping for the new data structure is valid.

One process for a flash memory array erasable on block boundaries includes allocating first and second blocks, each block including a number L sectors, in the flash memory array for L logical addresses. In this process, initializing the data structure in a particular sector includes erasing the one of the first and second blocks of L sectors including the particular sector. The process for replacing full data structures can include initializing data structures in the second block by erasing the second block, and when the M N-bit data fields in a data structure in the first block have been subject of write operations (i.e., the data structure is full), moving the data stored in the data structures in sectors of the first block to data structures in the second block.

Also, an apparatus is described including a flash memory array including a plurality of sectors of data cells having sector addresses, with logic to store data structures according to the method described above for byte-mode read and write operations in flash memory. The apparatus can include a data processor, integrated on a single chip with the flash memory array, or in a computer system having access to the flash memory array, along with instructions executable by the processor for carrying out the method described above. The instructions executable by the processor can be stored in the flash memory array, or elsewhere accessible to the data processor.

A machine readable data storage device is described, comprising a machine readable data storage medium storing instructions executable by a processor having access to a memory array including a plurality of sectors of data cells having sector addresses where the instructions comprise logic for carrying out the processes described herein.

The technology is described herein with reference to byte-wide operations throughout as an aid to clarity. The process may be generalized from writing a byte (e.g. 8 bits) at a time to writing any N-bit-wide data set (e.g. 16 or 32 bits) at a time, with corresponding adjustments in the sizes of the data fields in the data structures, as will be understood in the art.

Also, the terms "sector" and "block" are used here to refer to sets of data cells. These terms do not refer necessarily to sets of data cells that correspond strictly with a physical segmentation of the flash memory array, although it may be advantageous to consider any such physical segmentation in the allocation of blocks and sectors for the purposes described herein.

Techniques described herein utilize an erase-once, program-many progressive indexing structure managing data in a flash memory device which avoids the need to perform sector erase operations each time a byte of data stored in the flash memory device is updated. A data structure is stored in an addressable sector of the array, which includes indexing data, status data and the byte of data for the logical address mapped to the sector, which can be managed using erase-once, program-many procedures. As a result, a large number of write operations can be performed before a sector erase operation is needed for a given sector. Consequently, flash memory can be used for high-speed byte access.

Other aspects and advantages of the present invention can be seen on review of the drawings, the detailed description, and the claims which follow.

DETAILED DESCRIPTION

A detailed description of embodiments of the present invention is provided with reference to the FIGS. 1-12.

Figure 1A:
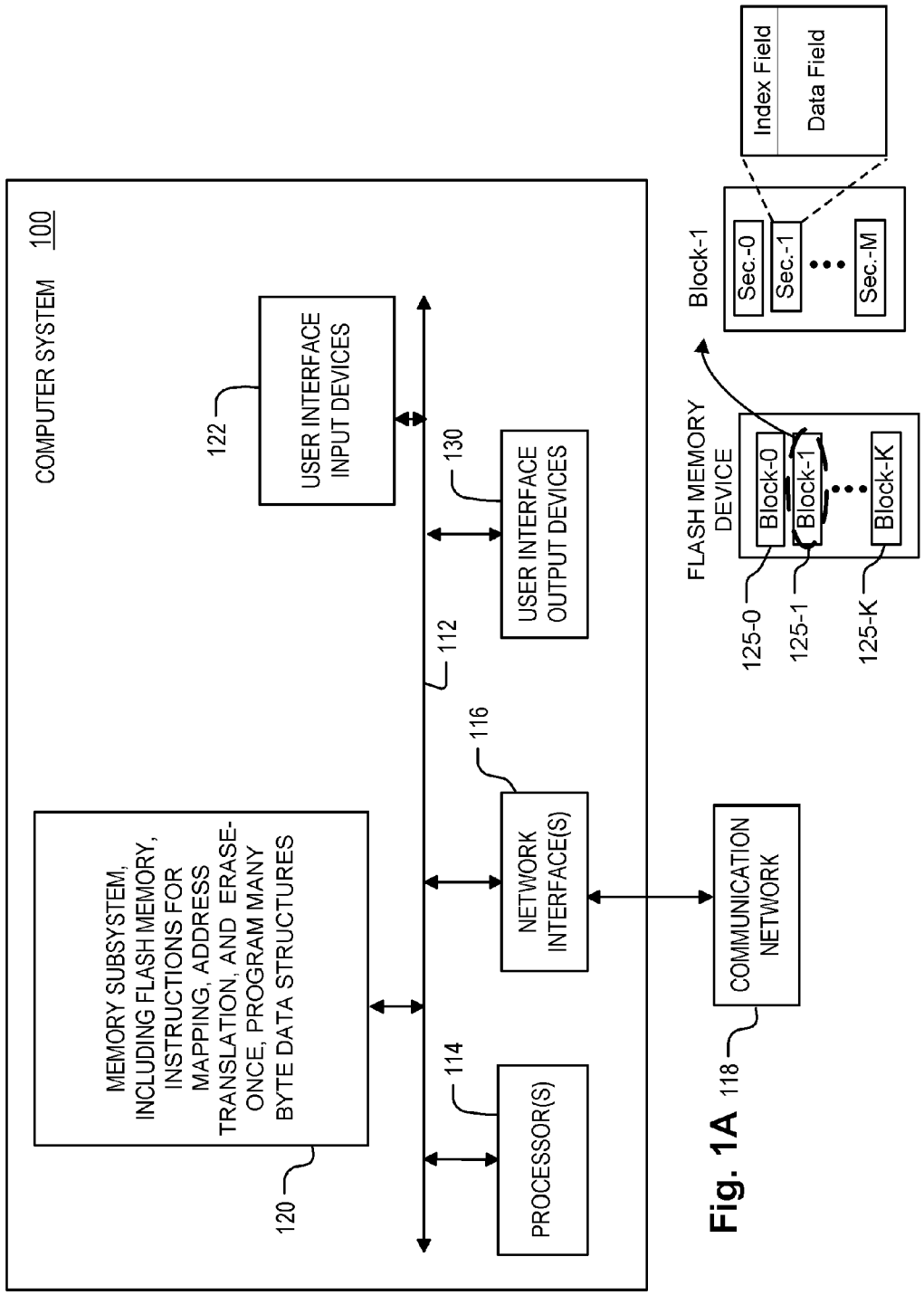
FIG. 1A is a simplified block diagram of a computer system suitable for organizing data in a flash memory device using the techniques described herein.

FIG. 1A is a simplified block diagram of a computer system 100 suitable for organizing data in a memory subsystem 120 including a flash memory device, such as an Serial Peripheral Interface SPI compliant serial flash device, using the techniques described herein. Computer system 100 typically includes at least one processor 114 which communicates with a number of peripheral devices via bus subsystem 112. These peripheral devices may include addition flash memory devices (not shown), user interface input devices 122, user interface output devices 130, and a network interface subsystem 116. The input and output devices allow user interaction with computer system 100. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, or any other mechanism for communication of information. While in one embodiment communication network 118 is the Internet, in other embodiments communication network 118 may be any suitable computer network.

User interface input devices 122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to accommodate all possible types of devices and ways to input information into computer system 100 or onto communication network 118.

User interface output devices 130 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visual image. The display subsystem may also provide non-visual display such as via audio output devices. In general, use of the term "output device" is intended to include all possible types of devices and ways to output information from the computer system 100 to the user or to another machine or computer system.

Memory subsystem 120 can store the basic programming and data constructs that provide the functionality of certain embodiments described herein, including the instructions for logical-to-physical address mapping and translation, and instructions used for organization of data within a flash memory device (discussed below). These software modules are generally executed by processor 114. The basic programming and data constructs may be stored in flash memory or other memory devices. Also, the memory subsystem 120 may include other storage devices, including random access memory (RAM) for storage of instructions and data during program execution, portable memory devices, disk drive systems, and so on.

The memory subsystem 120 can comprise a machine readable data storage device, comprising a machine readable data storage medium storing instructions executable by a processor having access to a memory array including a plurality of sectors of data cells having sector addresses where the instructions comprise logic for carrying out the processes described herein.

In the illustrated embodiment, the data processor 114 executing instructions to carry out the various operations described herein is external to the integrated circuit including flash memory. Alternatively, the flash memory can be included on the same chip as the data processor or other type of controller to control the management of data and carry out the various operations described herein. For example, the controller can be a state machine implemented using special-purpose logic circuitry as known in the art. In alternative embodiments, the controller comprises a general-purpose processor, which may be implemented on the same integrated circuit, which executes a computer program to control the operations of the flash memory device 120. In yet other embodiments, a combination of special-purpose logic circuitry and a general-purpose processor may be utilized for implementation of the controller.

Bus subsystem 112 provides a mechanism for letting the various components and subsystems of computer system 100 communicate with each other as intended. Although bus subsystem 112 is shown schematically as a single bus, alternative embodiments of the bus subsystem 112 may use multiple buses. In some embodiments, the data, address and command signals between the flash memory in the memory subsystem 120 and the bus subsystem 112 are applied on shared lines in a serial fashion, such as can be implemented using serial peripheral interfaces as known in the art.

Figure 1B:
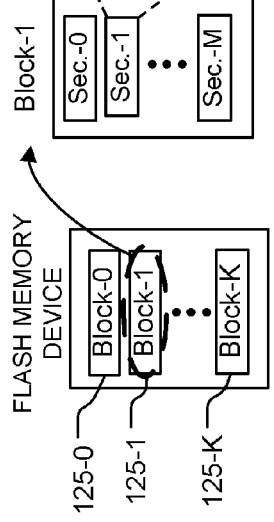
FIG. 1B illustrates a block and sector organization of a flash memory array storing data structures for high-speed byte access.

As illustrated in FIG. 1B, a flash memory array can have a plurality of physical blocks, including Block-0 125-0 through Block-K 125-K for storing data organized using the techniques described herein. Each of the blocks Block-0 125-0 through Block-K 125-K are separately erasable from the other blocks. The block size and number of blocks will vary from embodiment to embodiment. For example, in some embodiments the size of each of the blocks can be 2 KB, 4 KB, 8 KB, or 16 KB. Other block sizes may alternatively be used.

As noted above, the flash memory array may also include additional blocks for storing the instructions for logical-to-physical address mapping and translation, and the instructions for the organization of the data in the blocks Block-0 125-0 through Block-K 125-K as described herein.

The instructions include the mapping between the logical addresses specified by the computer system 100, and the physical addresses of sectors of the data cells in the flash memory device 120.

The blocks Block-0 125-0 to Block-K 125-K can each include one or more sectors. For example, a 4 KB block can include 128 32-byte sectors. Each of the 128 sectors can include one data structure for storing a byte of data. One-hundred-twenty-eight logical addresses can be mapped to the 128 sectors in the block. As described below, the sector addresses are mapped to particular logical addresses for bytes of data, and are adapted to store a data structure for byte access.

The data structure in a given sector of data cells includes an index field and a data field in examples described here. The index field includes a pointer to a particular byte-wide segment in the data field used to store the byte of data for the mapped logical address. In embodiments, the index field of one of the sectors can also include a status flag field storing data which indicates status of the sector. In examples described here, sector status is maintained on block boundaries, and indicates status of sectors in the block, such as whether a sector in the given block is currently active (working), inactive (erased), dirty, or temporary. Thus, all data structures in the block have the same status. In alternatives, sector status can be maintained on sector boundaries. Also, in some embodiments, a single status flag may be implemented for each block, and not included in the index field of the data structure in each sector.

In a write operation, an erased data cell in the index field is programmed to update the pointer to an erased one of the byte-wide segments in the data field, and particular erased data cells in that erased one of the byte-wide segments are programmed to store the byte of data for the mapped logical address.

For purposes of clarity, in examples described below, the term "program" is used to refer to an operation which changes the data value in the memory cell to logical "0." "Erase" refers to an operation which changes the data value in the memory cell to logical "1." The data values corresponding to the programmed and erased states can be 1 and 0 respectively as well. Also, in multi-level cells, the programmed value can assume multiple values. However, as described above, the term "program" more generally refers to an operation which can be carried out in flash memory on a cell-by-cell basis, while the term "erase" more generally refers to an operation which, due to the configuration of the flash memory cells, is carried out in flash memory on a larger basis, on boundaries that are efficiently enforced for a given array structure. Thus, depending upon the configuration of the flash memory cells, in some embodiments programming and erasing consists of decreasing and increasing the threshold voltages respectively.

The size of the data field is a tradeoff between how often a block or sector erase operation will be performed and the number of logical addresses that can be mapped to a given block in the flash memory device (discussed below), and thus can vary from embodiment to embodiment.

The flash memory device also can include a plurality of inactive blocks or sectors that serve as transfer units to store updated data for from time to time, such as when the data field in a current data structure is full.

Figure 2:
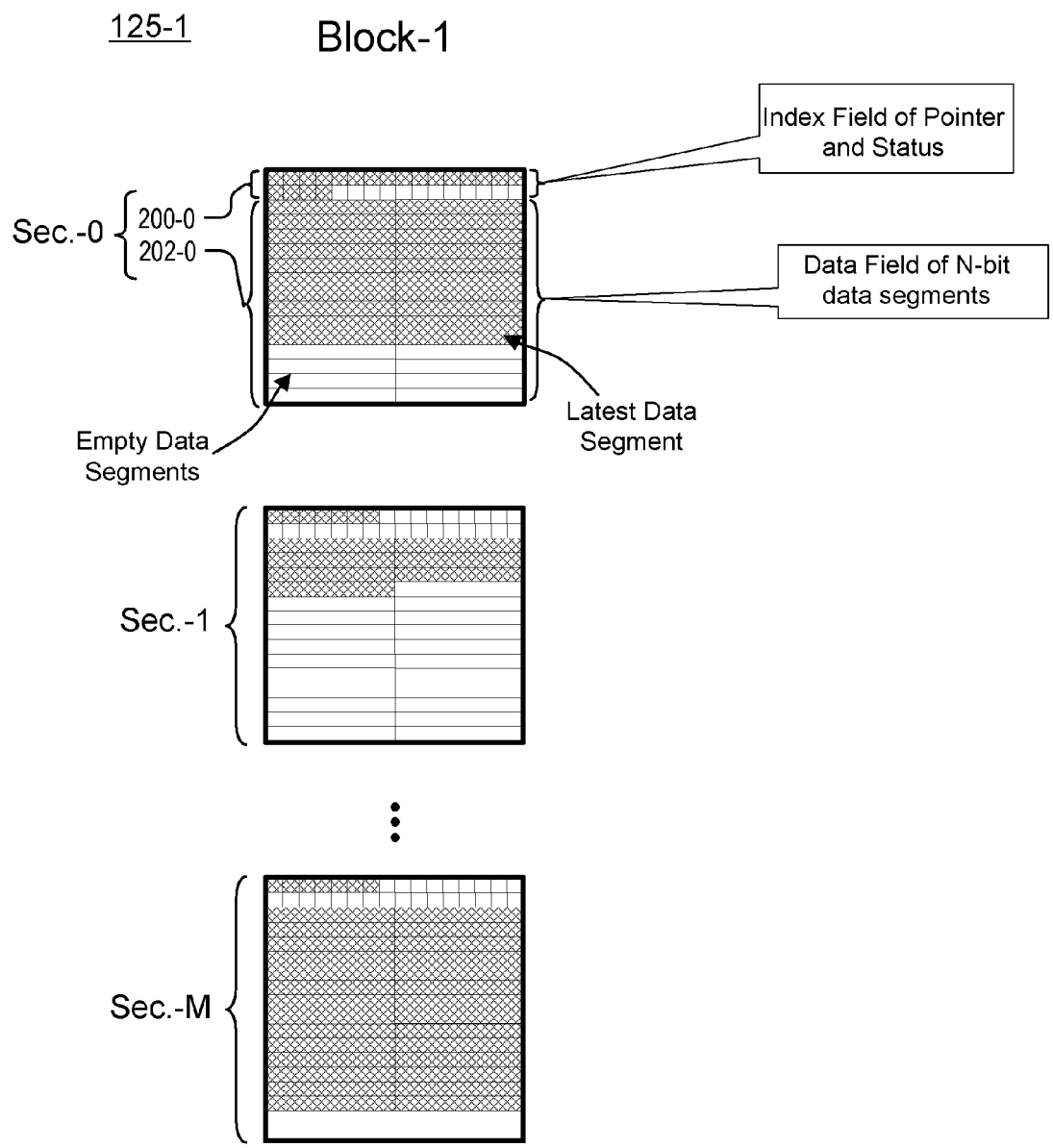
FIG. 2 further illustrates the arrangement of data within an example block including a plurality of sectors.

FIG. 2 shows a Block including several sectors Sec.-0 through Sec.-M. In embodiments, each of the sectors Sec.-0 through Sec.-M may be separately erasable. In examples described here, sectors are not separately erased, but rather erase operations are carried out on block boundaries for the section of the array used for high-speed byte access. As shown in FIG. 1B, a data structure is allocated to an addressable sector, and includes an index area storing the index field and a data area storing the data field.

The data structure in Sec.-0 includes an index field 200-0 which includes a pointer to a particular byte-wide segment in the data field 202-0 where the byte of data for the corresponding logical address are stored. The pointer is represented as a sequence of programmed and erased data cells in the index field 200-0.

In a write operation for a byte having the logical address mapped to the sector of data cells Sec.-0, an erased data cell in the index field is programmed to update the pointer in the index field 200-0 to point to an erased one of the byte-wide segments in the data area which stores the data field 202-0, and particular erased data cells in that erased one of the byte-wide segments are programmed to store the byte of data for the logical address.

In the illustrated example, in response to respective write commands the data cells in the index field are programmed in address order, starting with the data cell for the bit in the index field for the first write operation, the second bit for the second write operation, etc., with data cells following the most recently programmed data cell remaining erased. Similarly, the byte-wide segments in the data field are written in an order, such as address order, starting with the first byte-wide segment for the first write operation, the second byte-wide segment for the second write operation, etc., with byte-wide segments following the more recent byte-wide segment remaining erased (or empty).

In alternative embodiments, in response to respective write commands the sequence of data cells programmed in the index field, and the sequence of byte-wide segments written to in the data field, can be different than that illustrated in FIG. 2. For example, the data cells in the index area can be programmed in order starting with the last data cell for the first write operation, etc.

By writing updated data to erased byte-wide segments in data field 202-0 in the data field, rather than directly overwriting data, which would require an erase operation, the data cell in the index field used to update the pointer and the data cells used to store the updated byte of data are programmed without an erase process. This results in a program many, erase once procedure requiring a small number of sector or block erase operations compared to the number of write operations, which effectively increases the endurance of the flash memory array.

Since the updated data is written to empty segments in the data field, eventually the data field will become full. Thus, from time to time, the data structures stored in the sectors Sec.-0 through Sec.-M of Block-1 are remapped to corresponding fresh data structures in sectors Sec.-0 through Sec.-M in Block 0, either on a sector-by-sector or block-by-block basis. The term "from time to time" as used herein is intended to be construed generally to mean occasionally, and is therefore not restricted to uniform, cyclic, or otherwise equal time intervals.

In addition to using the data stored in the status flag field of the index field 200-0 to identify the active or inactive status of sectors in the Block-1, the data in the status flag field is also used to ensure that the updated data sector is composed and properly stored in the new block. This is discussed in more detail below with respect to FIG. 9.

Figure 3:
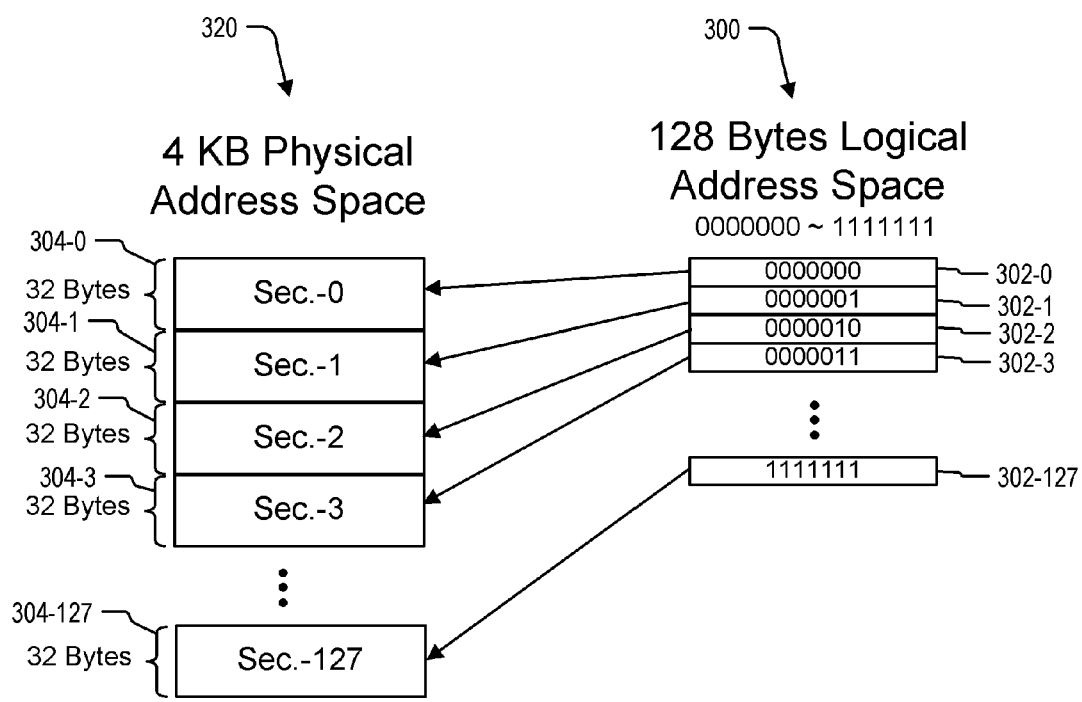
FIG. 3 illustrates an example of the mapping logical addresses for 128 bytes to a block having 128 sectors in the physical address space of the flash memory device.

FIG. 3 illustrates an example of the mapping between logical addresses 302-0 through 302-127 in the logical address space 300 and a block having sectors Sec.-0 through Sec.-127 in the physical address space 320 of the flash memory device 120. In this example, each logical address in the logical address space 300 is mapped to a corresponding 32-byte sector of data cells in the physical address space 320. Thus, logical address 0000000 (reference numeral 302-0) is mapped to Sec.-0 304-0, logical address 0000001 (reference numeral 302-1) is mapped to Sec.-1 304-1, and so on.

In this example, each sector of data cells includes a 4-byte index field and a 32-byte data field, and is used to store 8 bits (1 byte) of data for the corresponding logical address. Thus, in this example, the data field in a given sector of data cells can support 32 single byte write operations for the corresponding logical address before the data field becomes full.

Figure 4:
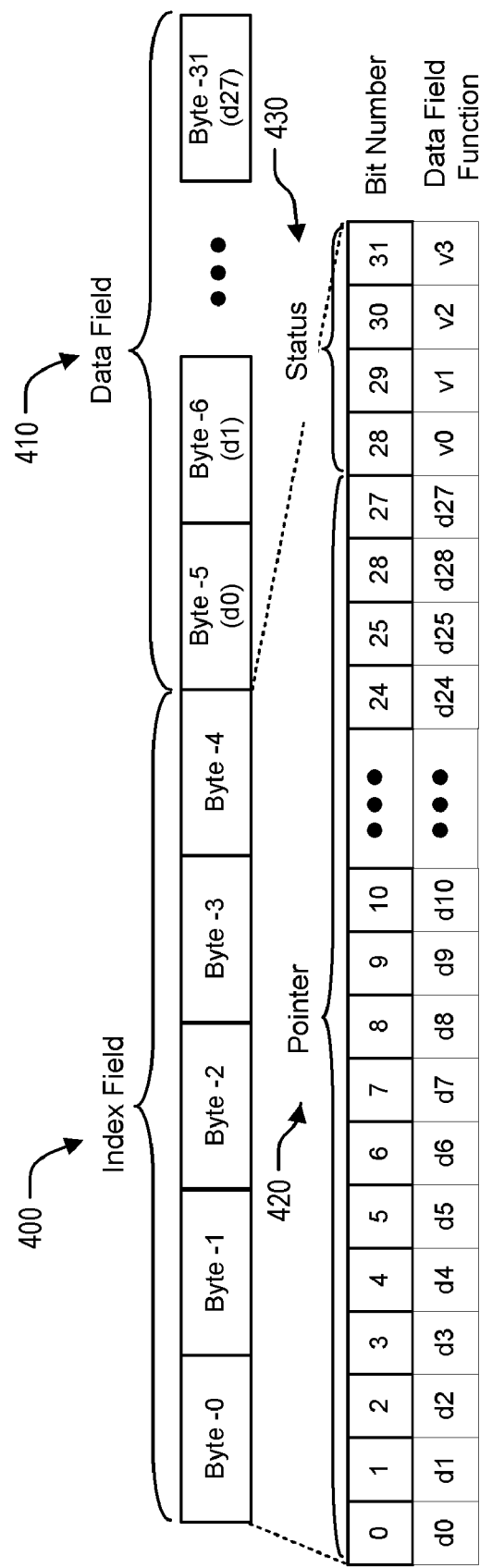
FIG. 4 further illustrates the arrangement of data within an example data structure in a sector of data cells.

FIG. 4 further illustrates the arrangement of data within Sec.-0 304-0. As shown in FIG. 4, the sector Sec.-0 of data cells stores a data structure which includes index field 400 and data field 410. In this example, the data in bits 0~27 in the index field 400 forms a pointer 420 to a particular byte-wide segment in the data field 410 used to store the 8 bits of data for the mapped logical address 0000000 (reference numeral 302-0). The data in bits 28~31 in the index field forms a status flag field 430 which indicates the status of the sector, which in this example is maintained on a block basis, indicating a common status in all of the sectors Sec.-0 through Sec.-127 (described in more detail below).

As illustrated in FIG. 4, the data in bits 0~27 used to form the pointer 420 identifies the particular segment in the data field 410 used to store the 8 bits of data of logical address 0000000 (reference numeral 302-0). For example, for a one-bit-per-cell implementation, if the data in bit 0 in the index field is programmed, and all the remaining cells for bits 1~27 are erased, the pointer 420 points to segment d0, which is the first segment in address order in the data field 410. If the data cells for bits 0~1 are programmed, and all the remaining cells for bits 2~26 are erased, the pointer 420 points to segment d1, which is the second segment in the data field 410. Alternative techniques for arranging the data for the pointer 420 to identify the particular segment can also be used. Also, in a multiple-bit-per-cell embodiment, a data cell can store two or more bits of the pointer.

Figure 5:
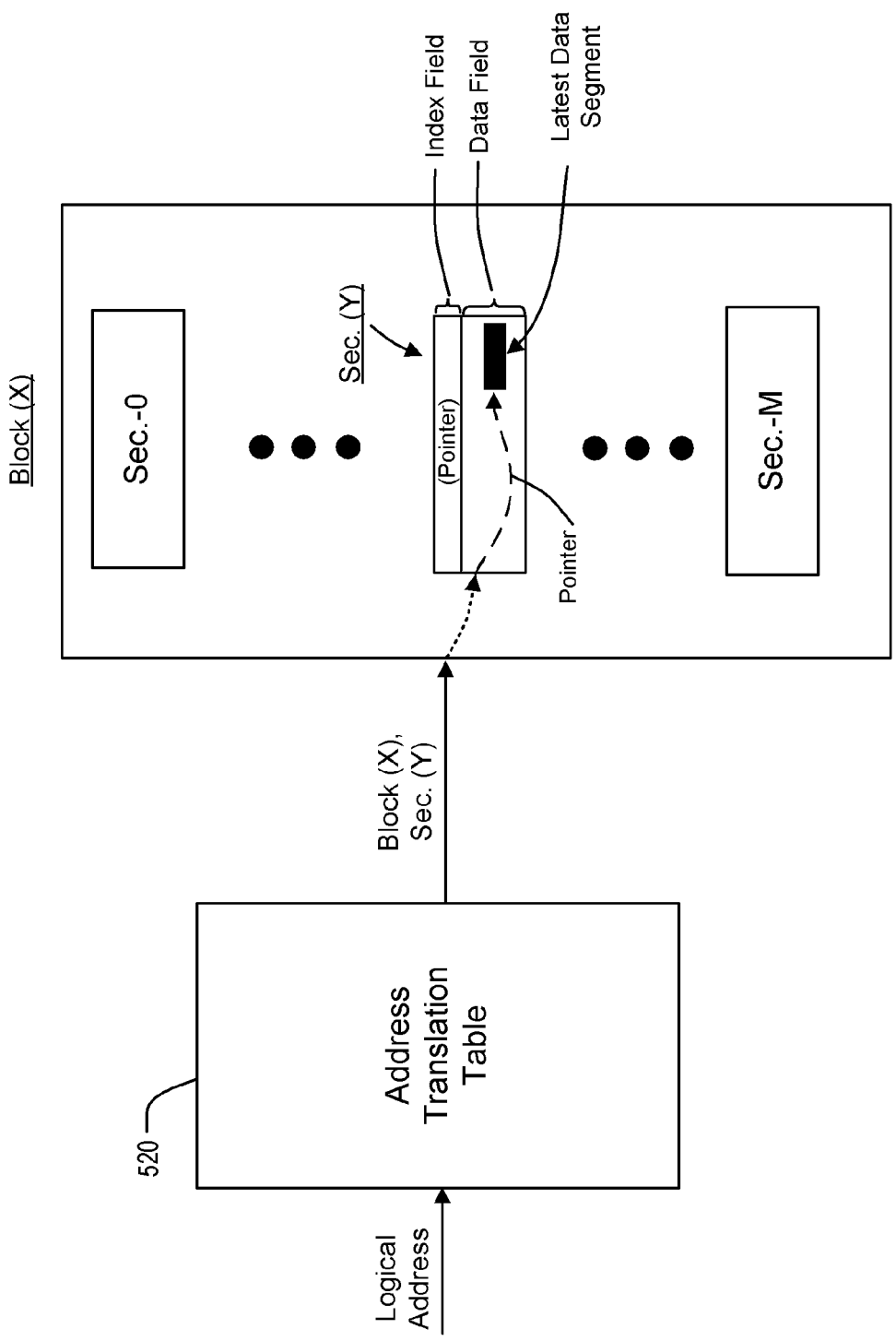
FIG. 5 is an illustration of the translation between the logical address space and the physical address space.

FIG. 5 is an illustration of the translation between the logical address space and the physical address space. The logical addresses are mapped to the corresponding blocks using an address translation table 520. For a particular logical address, the address translation table 520 identifies the block and the sector of data cells in that block which correspond to the particular logical address. The pointer stored in the index field of the corresponding data structure of data cells is then read to identify the segment in the data field which stores the data for the logical address.

The use of the pointer obviates the need to update the address translation table 520 each time data in the flash memory device 120 is updated, while also enabling accurate tracking of the valid data. Since the address translation table 520 need not be continuously updated, it may be stored in the flash memory. During operation the address translation table 520 may be loaded into higher access speed memory, such as DRAM or SRAM accessible by the processor 114 of FIG. 1.

Figure 6:
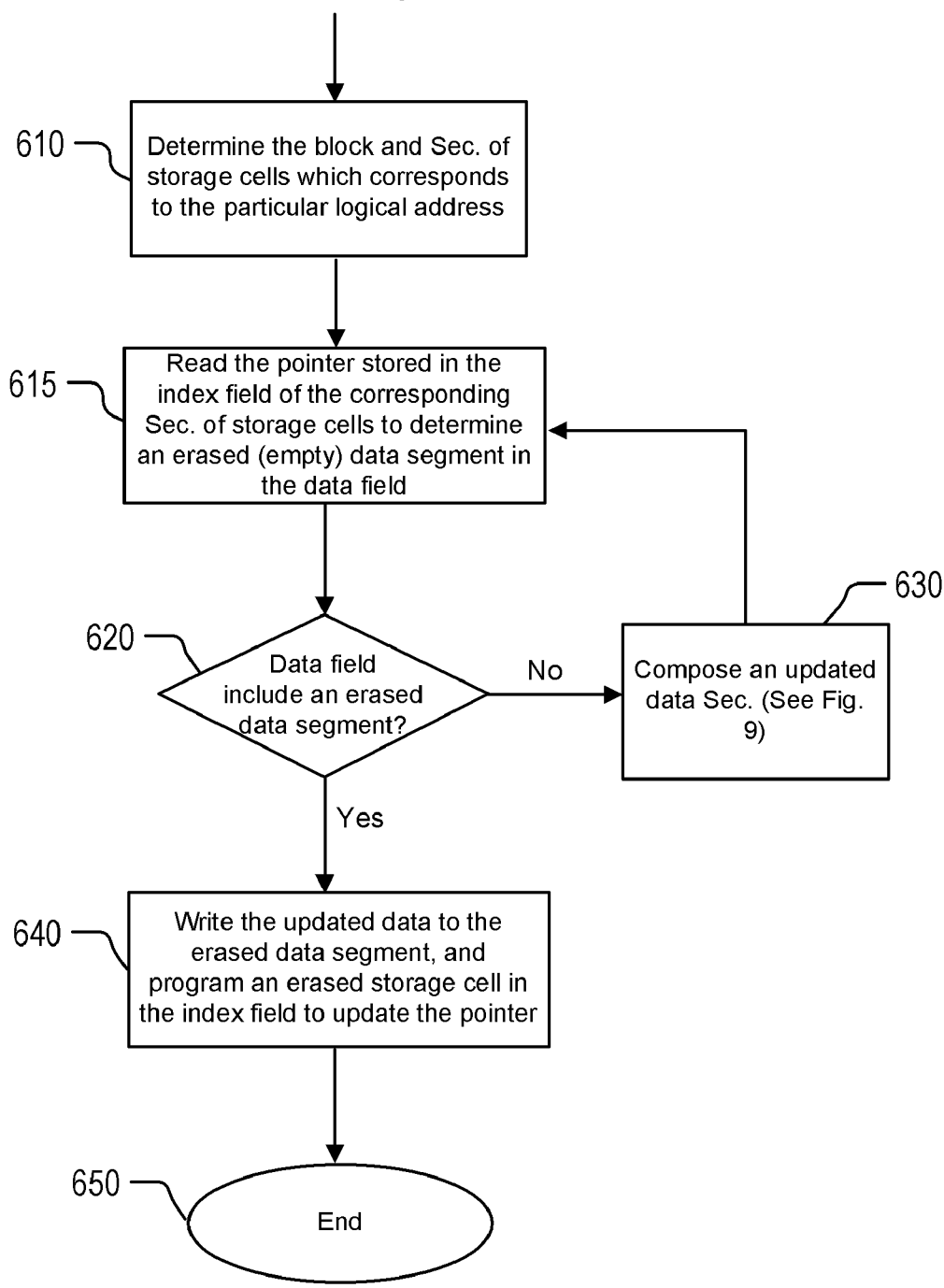
FIG. 6 is a flow chart of a write operation to store an updated byte of data for a particular logical address.

FIG. 6 is a flow chart of a write operation 600 which can be executed by the processor 114 to store a byte of data for a particular logical address, or other N-bit segment of data. As with all flowcharts herein, it will be appreciated that some of the steps may be combined, performed in parallel or performed in a different sequence without affecting the functions achieved. In some cases a rearrangement of steps will achieve the same result only if certain other changes are made as well, and in other cases a rearrangement of steps will achieve the same results only if certain conditions are satisfied. Such rearrangement possibilities will be apparent to the reader.

In response to a write command to store a byte of data at a logical address, at step 610 the block and sector of data cells which corresponds to the particular logical address is determined using the address translation table discussed above.

At step 615, the pointer stored in the index field of the corresponding data structure of data cells is read to determine an erased segment in the data field to store the byte of data.

At step 620, if the data field does not include an erased segment then the data field is full. In such a case, the operation 600 continues to block 630 where an updated data structure for the sector storing the data structure is composed. The composing operation is discussed below with reference to FIG. 9.

If an erased segment is found in the data field, the operation 600 continues to block 640. At step 640, an erased data cell in the index field is programmed to update the pointer to that erased segment, and the updated data is written to the erased segment. The write operation 600 then ends at step 650.

Figure 7:
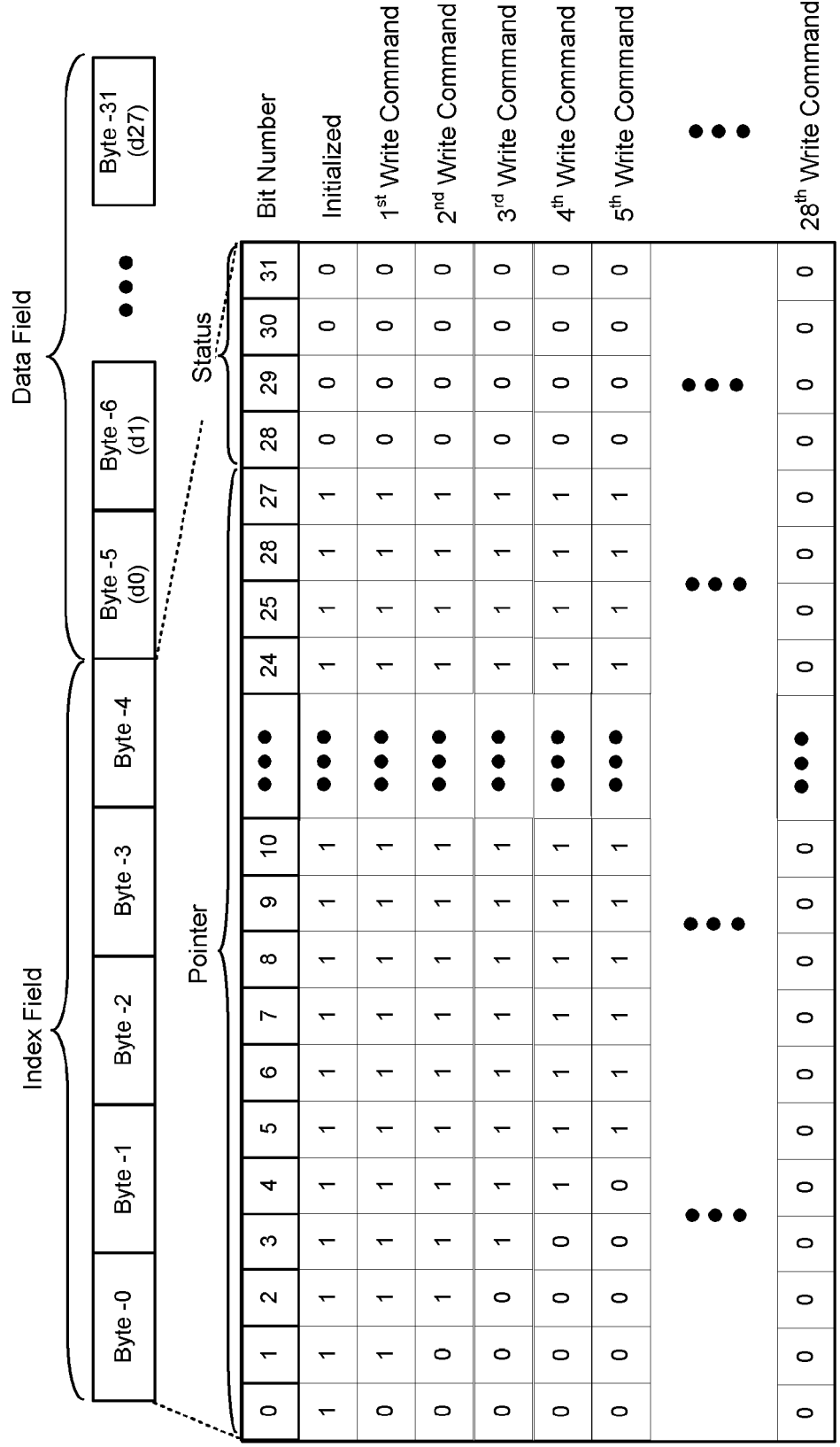
FIG. 7 illustrates an example of the programming of erased data cells in the index field during operation.

FIG. 7 illustrates an example of the programming of erased data cells in the index field during operation. As illustrated in FIG. 7, bits 0~27 are used to store the pointer, and bits 28~31 are used to store a status flag which indicates the status of the sector or block (described in more detail below). In the example, the status flag for each sector in the block is set to indicate sector active, with all bits programmed to "0000."

As illustrated in FIG. 7, in response to a first write operation, the pointer is updated by programming the data cell of bit 1 to logic 0, in a second write operation the data cell of bit 2 is programmed to logic 0, and so on until all 28 bits in the pointer field are programmed to logic 0. No erase operation is executed during this programming in order. Even though a given byte in the pointer field is accessed multiple times for programming, no erase is needed because a program process performs a byte read or other similar step to prevent a pre-erase if no cells in the byte are being changed from the programmed to the erased state.

In alternative embodiments, the sequence of data cells programmed in the index field can be different than that illustrated in FIG. 7. For example, the data cells in the index field can be programmed in address order starting with the data cell of the last bit 27 of the pointer in response to the first write operation, and so on.

Figure 8:
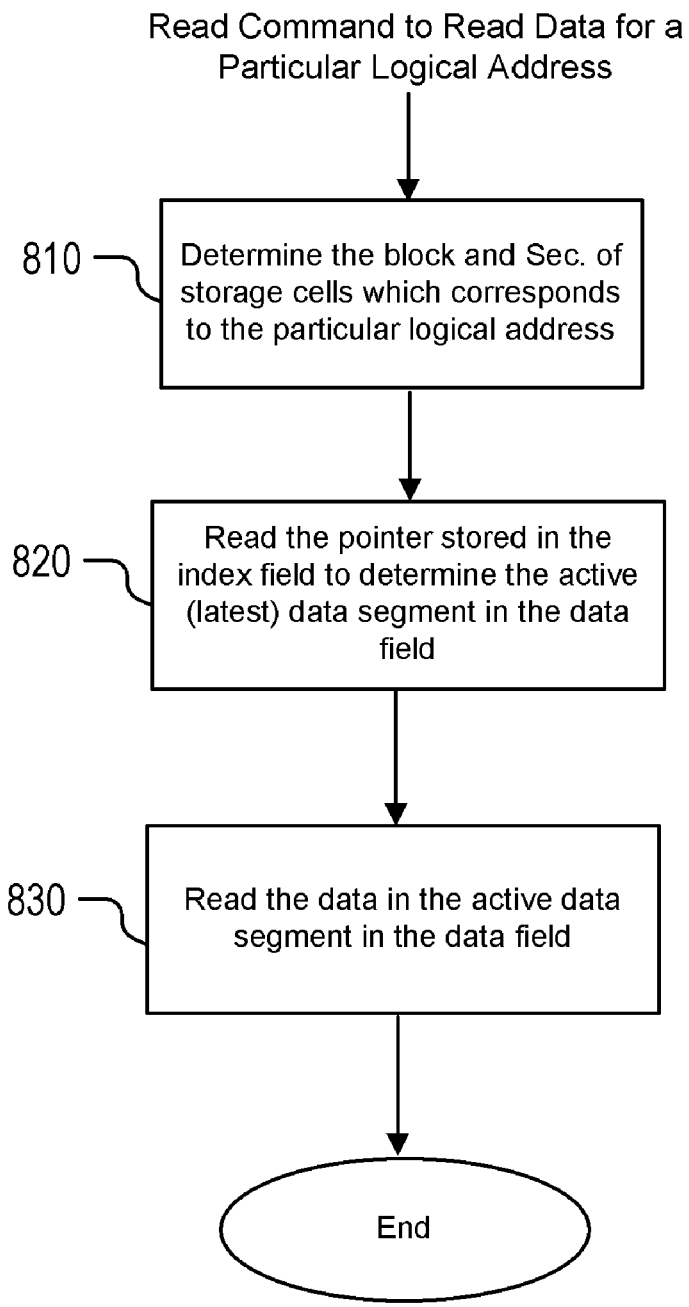
FIG. 8 is a flow chart of a read operation to read data for the particular logical address

FIG. 8 is a flow chart of a read operation 800 which can be executed by the processor 114 to read data for the particular logical address.

In response to a read command to read data for the particular logical address, at step 810 the block and sector of data cells which correspond to the particular logical address is determined using the address translation table discussed above.

At step 820, the pointer stored in the index field of the corresponding data structure in a sector of data cells is read to determine the active (latest) segment in the data field which stores the data for the logical address. The data stored in the active segment is then read and output at step 830.

As was discussed above, from time to time an updated data set for the block is composed and written to a previously inactive block.

Figure 9:
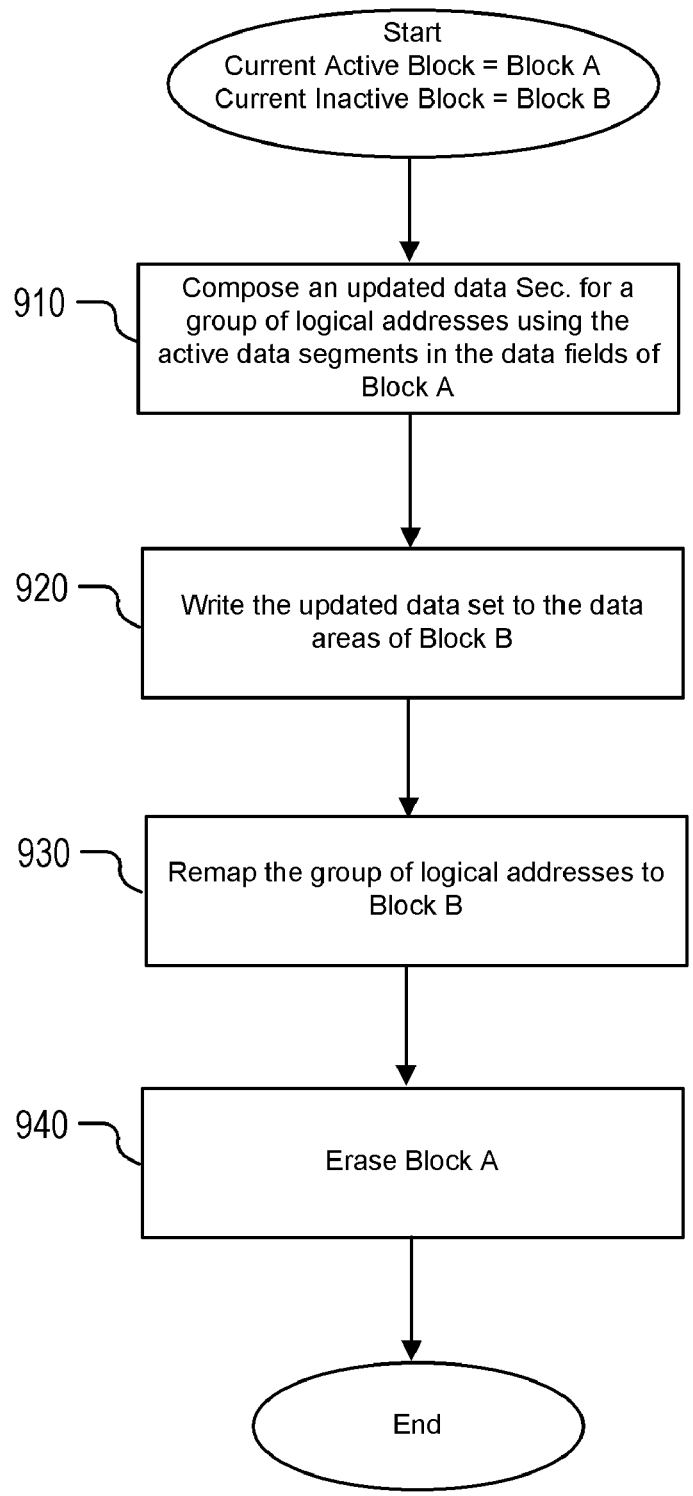
FIG. 9 illustrates a flow chart of an operation for composing an updated data set.

FIG. 9 illustrates a flow chart of a composing operation 900 which can be executed by the processor 114. The operation 900 may be initiated when the data field for a data structure in a sector of data cells in a given block becomes full, or at any other time.

For clarity purposes in the discussion below, the block that is active before the operation 900 begins is referred to as "Block A," while the block that is inactive before the operation 900 begins is referred to as "Block B." A block used in this process can be a minimum set of cells that can be erased in an erase operation for the flash memory being used. The number of sectors, and data structures, allocated to each block can be any number from 1 to many, as designed to suit a given expected pattern of use.

At step 910, the data stored in the active segments in the data fields of Block A are read to compose an updated data set for a group of logical addresses mapped to Block A. The updated data set contains the valid data for the group of logical addresses mapped to Block A.

At step 920, the updated data set is written to the data fields for the sectors in Block B. At step 930, the addresses translation table is updated to remap the group of logical addresses to Block B. At step 940 Block A is erased. In some embodiments the erase operation of Block A at step 940 is not carried out immediately following the remapping of step 930, but instead is done when resources such as the processor 114 are not needed to carry out other operations.

As described above, the data in the status flag field can be used to ensure that the updated data set is composed and properly stored in the previously inactive block.

Figure 10:
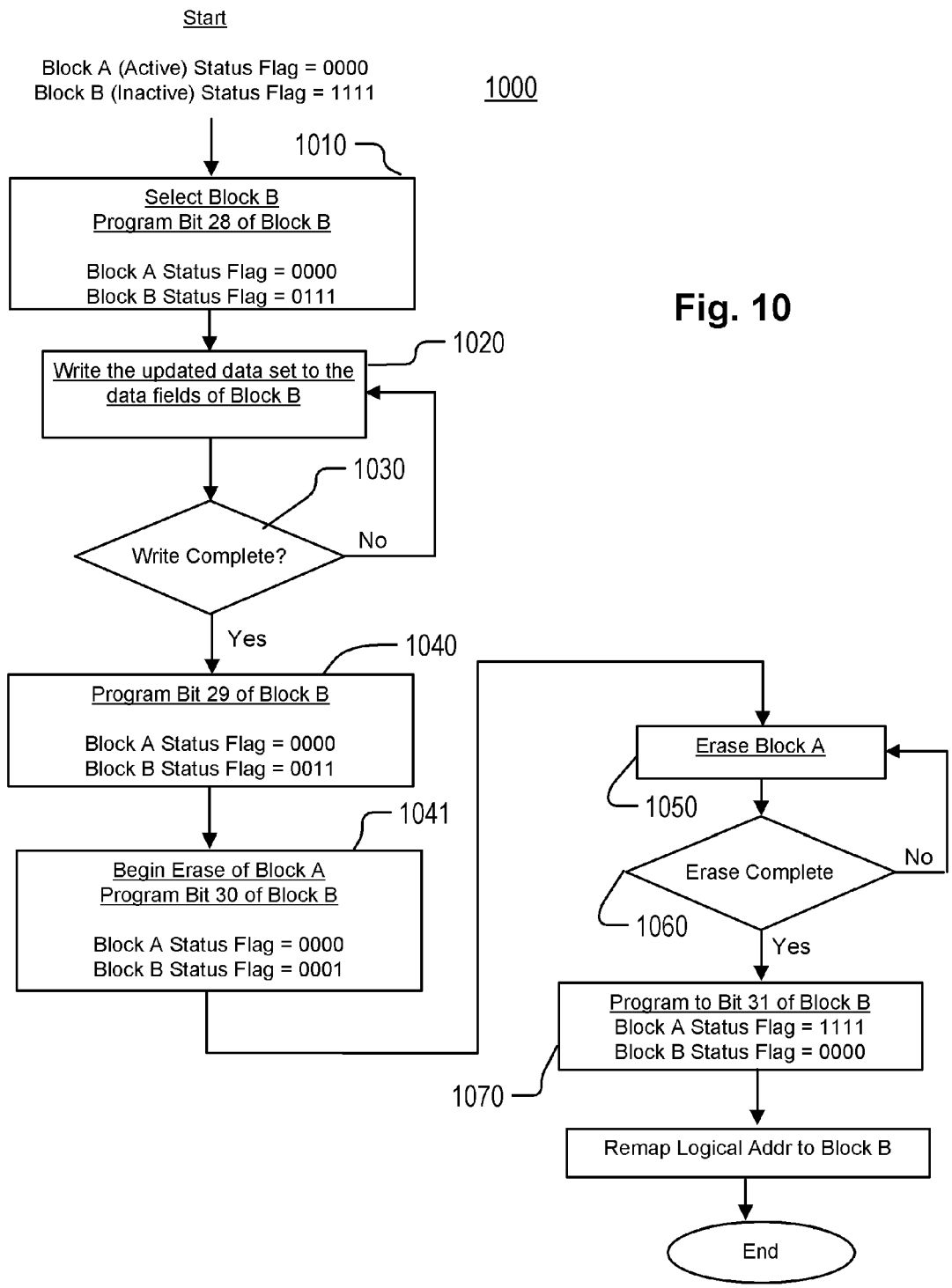
FIG. 10 illustrates an embodiment of a transition flow diagram of the change in the data stored in the status flag field during the operation of FIG. 9.

FIG. 10 illustrates an embodiment of a transition flow diagram 1000 of the change in the data stored in the status flag fields in all the data structures of Block A and Block B during the composing operation 900 of FIG. 9.

As shown in FIG. 10, at the start of the composing operation 900 the data cells of the bits used to store the status flag field of the active Block A are in a programmed state (0000), and the data cells of the bits used to store the status flag field of the inactive Block B are in an erased state (1111).

Block B is selected, and prior to writing the updated data set to the data fields of Block B, at step 1010 the data cells of bit 28 in the sectors in Block B are programmed to change the data in the status flag field of Block B from "1111" to "0111." By changing the data of the status flag field of Block B in this manner, the data of the status flag field can be used to determine whether an interruption such as power down occurred prior to writing the updated data set to Block B.

Next, the data in the data structures of Block A are written to initialized data structures in Block B at step 1020. Next the process determines whether the write is complete at step 1030. Following the writing of the updated data set to the data fields of Block B (steps 1020 and 1030), at step 1040 the data cells of bit 29 in the status flags in sectors of Block B are programmed to change the data in the status flag field of Block B from "0111" to "0011." The data in the status flag field can be used to ensure that Block B includes the updated data set for the group of logical addresses. Then, it is safe to begin erase of the data structures in Block A, and remap the logical addresses. Upon beginning the erase process, either immediately or when the processor has available resources, the data of the status flag area in the sectors of Block B is updated to "0001" at step 1041. Then the erase operation for Block A is begun at step 1050, and the process waits for the erase to complete at step 1060.

Since the status flag field of Block A is within the block, the erase operation of Block A (steps 1050 to 1060) also erases the data in the status flag field, which changes the data in status flag field of Block A to "1111" (inactive). Following the erase operation of Block A, at step 1070 the data cell of bit 31 in the status flag field is programmed to change the data in the status flag area of the sectors of Block B from "0001" to "0000" (active).

In the transition flow diagram 1000, the transition of the status flag field from inactive ("1111") to active ("0000") of Block B involves the programming of erased data cells in the status flag field. This technique eliminates the need to erase data cells in the status flag field each time it needs to be changed. As a result, the data for the status flag field can be stored in the Block B, rather than stored separately.

In alternative embodiments, the bits which are programmed to change the data in the status flag field can be different from those illustrated in FIG. 10.

As noted above, in some embodiments the erase operation of Block A at step 1050 is not carried out immediately, but instead is done when resources such as the processor 114 are not needed to carry out other operations.

Figure 11:
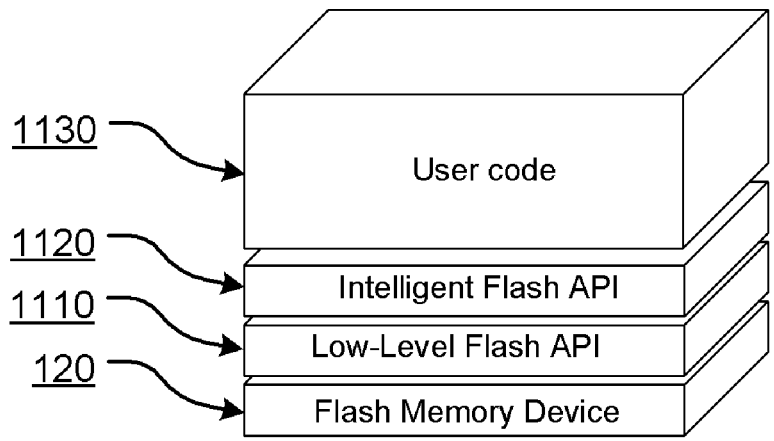
FIG. 11 illustrates an embodiment of the relationship between the different levels of software for the flash memory device.

FIG. 11 illustrates an embodiment of the relationship between the different levels of software for the flash memory device 120. The user code 1130 includes logic to provide logical addresses and the commands to read and write data in the flash memory device 120.

The Intelligent Flash Application Programming Interface (API) 1120 is a software module including logic to perform the logical-to-physical address mapping and translation, and logic for the management of the data written to and read from the flash memory to carry out the various operations described herein. The Intelligent Flash API 1120 translates the commands from the user code 1130 to corresponding physical addresses, which are then provided to the low-level flash API 1110 software module.

The low-level flash API 1110 is a software driver particularly adapted to function with the flash memory. The low-level flash API 1110 includes logic to perform the actual reading and writing of data in the flash memory device 120 in response to instructions and physical addresses provided by the Intelligent Flash API 1120.

The flash memory device 120, the low-level flash API 1110, and the Intelligent Flash API 1120 together emulate the programming and erasing of the flash memory device 120 on a byte-by-byte basis as described herein.

The flash memory and the low-level flash API 1110 can be implemented using a variety of commercially available off-the-shelf flash devices, such as the MX25L512 CMOS serial flash by Macronix International Corporation, Ltd. As a result, the Intelligent Flash API 1120 provides the ability to emulate the programming and erasing of the flash memory on a byte-by-byte basis as described herein, without necessitating the rewriting of the low-level drivers used by such devices.

In FIG. 11 the Intelligent Flash API 1120 is arranged between the user code 1130 and the low-level flash API 1110.

Figure 12:
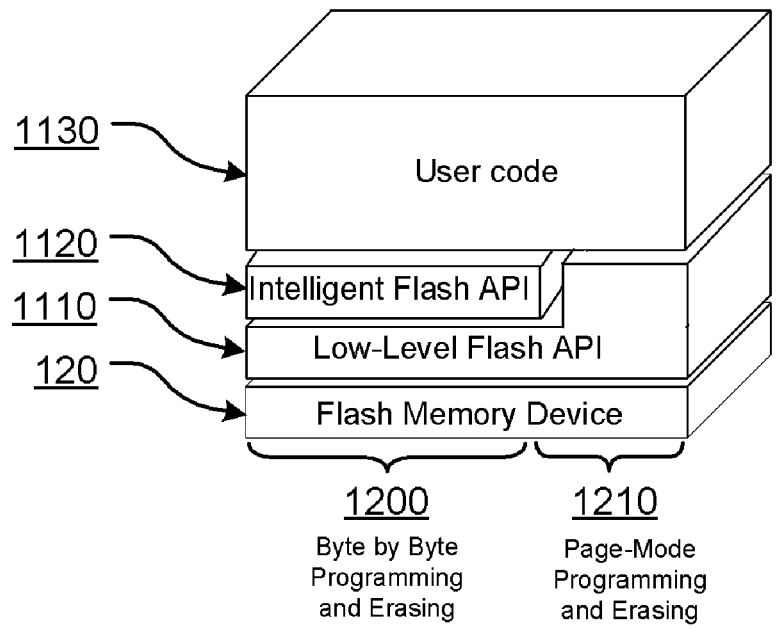
FIG. 12 illustrates a second embodiment of the relationship between the different levels of software for the flash memory device.

FIG. 12 illustrates a second embodiment of the relationship between the different levels of software for the flash memory device 120, in which the flash memory device includes a byte_write region 1200 and a page_write region 1210.

In FIG. 12 the Intelligent Flash API 1120 operates the byte_write region 1200 of the flash memory device 120 to emulate the programming and erasing on a byte-by-byte basis as described herein. In addition, the low-level flash API 1110 operates the page_write region 1210 to program and erase data on a block-by-block basis in the flash memory device 120.

In such an embodiment, the flash memory device 120 can be used both for applications typically served by an EEPROM and applications requiring a flash memory. As a result, a single, high-density flash memory device can be used to replace combinations of EEPROM and flash memory, which reduces the system cost and complexity.

The techniques described herein enable the use of block-based flash memory in a large number of information processing systems. As an example, the techniques described herein emulate programming and erasing of single bytes of data. More generally, the techniques described herein can be used to program and erase data of other sizes in block-based flash memory, where the size of the data to be programmed and erased is less than the size of the block.

Advantages of the techniques described herein include savings on system cost by allowing for the replacement of higher-priced lower-density EEPROM with block-based flash memory. By implementing the techniques described herein, the flash memory read/write endurance can be increased by greater than 1000× over traditional block-access algorithms.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for operating a flash memory array, comprising:
   allocating a plurality of sectors of data cells having sector addresses in the flash memory array to store respective data structures, a data structure having a physical address in one of the plurality of sectors arranged to store N-bits of data and including an index field and a data field;
   initializing the data structure by erasing the index field and the data field;
   writing N-bits of data having a logical address that maps to said physical address in the data structure by programming a data cell storing a bit in the index field corresponding with a particular N-bit segment in the data field, and programming the particular N-bit segment in the data field of the data structure to store the N-bits of data; and
   writing N-bits of data having the same logical address again, in the data structure having said physical address, by programming a different bit in the index field of the data structure corresponding with a different N-bit segment in the data field, and programming the different N-bit segment, wherein the index field includes a pointer field storing a number M of bits in address order, and the data field includes the number M of N-bit segments in address order, wherein when a data cell storing a first bit is programmed and a remainder of the data cells remain erased in the pointer field, the pointer field points to a first one of the N-bit segments in address order, when a data cell or data cells storing the first bit and a second bit are programmed and a remainder of the data cells remain erased in the pointer field, the pointer field points to a second one of the N-bit segments in address order, and when all of the number M of bits in the pointer field are programmed, the pointer points to a last one of the N-bit segments in address order.

2. The method of claim 1, further comprising:
   mapping logical addresses for N-bits of data to sector addresses of the plurality of sectors of data cells.

3. The method of claim 1, reading the N-bits of data in the data structure by reading an N-bit segment in the data field identified by the index field.

4. The method of claim 1, wherein a last one in order of the number M of bits in the pointer field to have been programmed corresponds with a most recently used one of the number M of N-bit segments in the data field.

5. The method of claim 1, including:
   initializing another data structure in the plurality of sectors of data cells including an index field and a data field by erasing the index field and the data field, and including:
   when the number M of N-bit data fields in the data structure have been subject of write operations, writing N-bits of data for the same logical address in the other data structure by programming a data cell in the index field of the other data structure corresponding with a particular N-bit segment in the data field of the other data structure, and programming the particular N-bit segment in the data field of the other data structure to store the N-bits of data.

6. The method of claim 1, wherein the data structure includes a status field, and the initializing includes erasing the status field, wherein the status field includes at least K−1 bits where K is an integer, in address order, and indicates a current one of K progressive states assumed during utilization of the data structure, including an initial state in which all data cells in the status field are erased, a first state in the K progressive states in which a data cell storing a first one of the bits in the status field is programmed and the a remainder of the data cells in the status field are erased, and a second state in the K progressive states in which a data cell or data cells storing the first one and a second one of the bits in the status field are programmed and a remainder of the data cells in the status field are erased, and a last state in the K progressive states when all of the K−1 bits in the status field are programmed.

7. The method of claim 6, wherein the initial state is initialized and no logical address is mapped to the data structure, the second state is data structure selected for mapping, a third state is write of N-bit data from source data structure or other source complete, a fourth state is erase of source data structure, if any, begun, and the last state is erase source data structure if any complete and logical address mapped to data structure.

8. The method of claim 1, including allocating first and second blocks, each block including a number L sectors, in the flash memory array for L logical addresses, and wherein initializing the data structure in a particular sector includes erasing the one of the first and second blocks of L sectors including the particular sector.

9. The method of claim 1, including allocating first and second blocks, each block including a number L of sectors, in the flash memory array for the number L of logical addresses, including:
   initializing data structures in the second block by erasing the second block, and including:
   when the number M of N-bit data fields in a data structure in the first block have been subject of write operations, moving the data stored in the first block to data structures in the second blocks.

10. A method for operating a flash memory array, comprising:
   allocating a plurality of sectors of data cells having sector addresses in the flash memory array to store respective data structures, a data structure in one of the plurality of sectors arranged to store N-bits of data and including an index field and a data field;
   initializing the data structure by erasing the index field and the data field;
   writing N-bits of data having a logical address in the data structure by programming a data cell storing a bit in the index field corresponding with a particular N-bit segment in the data field, and programming the particular N-bit segment in the data field of the data structure to store the N-bits of data; and
   writing N-bits of data having the same logical address again, in the data structure by programming a different bit in the index field of the data structure corresponding with a different N-bit segment in the data field, and programming the different N-bit segment wherein the data structure includes a status field, and the initializing includes erasing the status field, wherein the status field includes at least K−1 bits, where K is an integer, and indicates a current one of K progressive states assumed during utilization of the data structure.

11. An apparatus comprising:

a memory array including a plurality of sectors of data cells having sector addresses;

logic to store data structures in the plurality of sectors of data cells, the data structures arranged to store N-bits of data, a first data structure having a physical address in one of the plurality of sectors including an index field and a data field, the data field including a number M of N-bit segments;

logic to initialize the first data structure by erasing the index field and the data field; and logic to write N-bits of data having a logical address that maps to said physical address to the first data structure, by programming a data cell in the index field corresponding with a particular N-bit segment in the data field, and programming the particular N-bit segment in the data field of the first data structure to store the N-bits of data; and to write N-bits of data having the same logical address again, in the first data structure having said physical address by programming a different data cell in the index field of the first data structure corresponding with a different N-bit segment in the data field, and programming the different N-bit segment;

logic to initialize a second data structure in the one of the plurality of sectors of data cells including an index field and a data field by erasing the index field and the data field of the second data structure, and including:

logic executable when the number M of N-bit data fields in the first data structure have been subject of write operations, to write N-bits of data having the same logical address in the second data structure by programming a data cell in the index field of the second data structure corresponding with a particular N-bit segment in the data field of the second data structure, and programming the particular N-bit segment in the data field of the second data structure to store the N-bits of data.

12. The apparatus of claim 11, further comprising:

memory storing a logical address mapping table to map logical addresses for N-bits of data to said addresses of the plurality of sectors of data cells.

13. The apparatus of claim 11, including logic to read the N-bits of data in the data structure by reading an N-bit segment in the data field identified by the index field.

14. The apparatus of claim 11, wherein the index field includes a pointer field storing the number M of bits in address order, and the data field includes the number M of N-bit segments in address order, wherein a last one in address order of the number M of bits in the pointer field to have been programmed corresponds with a most recently used one of the number M of N-bit segments in the data field.

15. The apparatus of claim 11, wherein the index field includes a pointer field storing the number M of bits in address order, and the data field includes the number M of N-bit segments in address order, wherein when a data cell storing a first bit is programmed and the rest of the data cells remain erased in the pointer field, the pointer field points to a first one of the N-bit segments in address order, when a data cell or data cells storing the first bit and a second bit are programmed and the rest of the data cells remain erased in the pointer field, the pointer field points to a second one of the N-bit segments in address order, and when all of the number M of bits in the pointer field are programmed, the pointer points to a last one of the N-bit segments in address order.

16. The apparatus of claim 11, wherein the data structure includes a status field, and the logic to initialize the data structure erases the status field, wherein the status field includes at least K−1 bits, where K is an integer, and indicates a current one of K progressive states assumed during utilization of the data structure.

17. The apparatus of claim 11, wherein the data structure includes a status field, and the logic to initialize the data structure erases the status field, wherein the status field includes at least K−1 bits, where K is an integer, in address order, and indicates a current one of K progressive states assumed during utilization of the data structure, including an initial state in which all bits in the status field are erased, a first state in the K progressive states in which a data cell storing first one of the bits in the status field is programmed and a remainder of the data cells in the status field are erased, and a second state in the K progressive states in which a data cell or data cells storing the first one and a second one of the bits in the status field are programmed and a remainder of the data cells in the status field are erased, and a last state in the K progressive states when data cells storing the K−1 bits in the status field are programmed.

18. The apparatus of claim 17, wherein the initial state is initialized and no logical address mapped to the data structure, the second state is data structure selected for mapping, a third state is write of N-bit data from source data structure or other source complete, a fourth state is erase of source data structure, if any, begun, and the last state is erase source data structure if any complete and logical address mapped to data structure.

19. The apparatus of claim 11, including logic to allocate first and second blocks, each block including a number L of sectors, in the flash memory array for the number L of logical addresses, and wherein the logic to initialize the data structure in a particular sector includes erasing the one of the first and second blocks of the number L of sectors including the particular sector.

20. The apparatus of claim 11, including logic to allocate first and second blocks, each block including a number L of sectors, in the flash memory array for the number L of logical addresses, wherein the data fields in data structures in the sectors include the number M of N-bit segments, including logic to initialize data structures in the second block by erasing the second block, and including logic which executes a process, when the number M of N-bit data fields in data structure in the first block have been subject of write operations, to move the data stored in the first block to data structures in the second blocks and map logical addresses for the number M of N-bit segments to sectors in the second block.

21. An apparatus comprising:

a memory array including a plurality of sectors of data cells having sector addresses:

logic to store data structures in the plurality of sectors of data cells, the data structures arranged to store N-bits of data, a data structure in one of the plurality of sectors including an index field and a data field;

logic to initialize the data structure by erasing the index field and the data field; and logic to write N-bits of data having a logical address to the data structure, by programming a data cell in the index field corresponding with a particular N-bit segment in the data field, and programming the particular N-bit segment in the data field of the data structure to store the N-bits of data; and to write N-bits of data having the same logical address again, in the data structure by programming a different data cell in the index field of the data structure corresponding with a different N-bit segment in the data field, and programming the different N-bit segment, wherein at least part of said logic to store, logic to initialize and logic to write, includes a processor and instructions executable by the processor stored within the flash memory array.

22. A machine readable data storage device, comprising:

a machine readable, non-transitory data storage medium on the device storing instructions executable by a processor having access to a memory array including a plurality of sectors of data cells having sector addresses, the instructions including logic to store data structures in the plurality of sectors of data cells, the data structures arranged to store N-bits of data, a first data structure having a physical address in one of the plurality of sectors including an index field and a data field, the data field including a number M of N-bit segments;

logic to initialize the first data structure by erasing the index field and the data field; and logic to write N-bits of data having a logical address that maps to said physical address to the first data structure, by programming a data cell in the index field corresponding with a particular N-bit segment in the data field, and programming the particular N-bit segment in the data field of the first data structure to store the N-bits of data; and to write N-bits of data having the same logical address again, in the first data structure having said physical address by programming a different data cell in the index field of the first data structure corresponding with a different N-bit segment in the data field, and programming the different N-bit segment;

logic to initialize a second data structure in the one of the plurality of sectors of data cells including an index field and a data field by erasing the index field and the data field of the second data structure; and logic executable when the number M of N-bit data fields in the first data structure have been subject of write operations, to write N-bits of data having the same logical address in the second data structure by programming a data cell in the index field of the second data structure corresponding with a particular N-bit segment in the data field of the second data structure, and programming the particular N-bit segment in the data field of the second data structure to store the N-bits of data.

23. A machine readable data storage device, comprising:

a machine readable, non-transitory data storage medium on the device storing instructions executable by a processor having access to a memory array including a plurality of sectors of data cells having sector addresses, the instructions including:

logic to store data structures in the plurality of sectors of data cells, the data structures arranged to store N-bits of data, a data structure in one of the plurality of sectors including an index field and a data field;

logic to initialize the data structure by erasing the index field and the data field; and logic to write N-bits of data having a logical address to the data structure by programming a data cell in the index field corresponding with a particular N-bit segment in the data field, and programming the particular N-bit segment in the data field of the data structure to store the N-bits of data, and to write N-bits of data having the same logical address again, in the data structure by programming a different data cell in the index field of the data structure corresponding with a different N-bit segment in the data field, and programming the different N-bit segment;

wherein the index field includes a pointer field storing a number M of bits in address order, and the data field includes the number M of N-bit segments in address order; and wherein when a data cell storing a first bit is programmed and the rest of the data cells remain erased in the pointer field, the pointer field points to a first one of the N-bit segments in address order, when a data cell or data cells storing the first bit and a second bit are programmed and the rest of the data cells remain erased in the pointer field, the pointer field points to a second one of the N-bit segments in address order, and when all of the M bits in the pointer field are programmed, the pointer points to a last one of the N-bit segments in address order.

* * * * *